US012585793B2

(12) United States Patent
Alsharif

(10) Patent No.: US 12,585,793 B2
(45) Date of Patent: Mar. 24, 2026

(54) SYSTEM AND METHOD CONFIGURED TO COMMISSION AND DECOMMISSION ENDPOINT DEVICES USING STEGANOGRAPHY

(71) Applicant: SAUDI ARABIAN OIL COMPANY, Dhahran (SA)

(72) Inventor: Sultan Saadaldean Alsharif, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 130 days.

(21) Appl. No.: 18/497,604

(22) Filed: Oct. 30, 2023

(65) Prior Publication Data

US 2025/0139257 A1     May 1, 2025

(51) Int. Cl.
*G06F 21/60*          (2013.01)

(52) U.S. Cl.
CPC ................................. *G06F 21/602* (2013.01)

(58) Field of Classification Search
None
See application file for complete search history.

(56) References Cited

U.S. PATENT DOCUMENTS

| | | | |
|---|---|---|---|
| 7,266,682 B2 | 9/2007 | Euchner | |
| 8,527,779 B1 * | 9/2013 | Easttom, II | ........ H04N 21/8358 |
| | | | 713/150 |
| 10,193,839 B2 * | 1/2019 | Tandon | ................... H04L 63/10 |

| | | | |
|---|---|---|---|
| 10,620,938 B2 * | 4/2020 | Hamakawa | ............... G06F 8/65 |
| 11,023,835 B2 * | 6/2021 | Huneycutt | ............ G06F 16/288 |
| 12,206,759 B1 * | 1/2025 | Ivey | ...................... H04L 9/0631 |
| 2005/0113234 A1 | 5/2005 | Thomas et al. | |
| 2008/0148042 A1 * | 6/2008 | Brown | ................ H04L 63/0442 |
| | | | 713/154 |

(Continued)

FOREIGN PATENT DOCUMENTS

EP          1933249 A1     6/2008

OTHER PUBLICATIONS

Sakthisudhan et al., Steganalysis for Audio Streaming Transmission via Data Communication Networks, Date of Conference Jul. 26-28, 2012, Published Dec. 2012, IEEE-20180, pp. 1-5 (Year: 2012).*

(Continued)

*Primary Examiner* — Backhean Tiv
(74) *Attorney, Agent, or Firm* — Leason Ellis LLP

(57)          ABSTRACT

A system and method are configured to commission and decommission an endpoint device using steganography. The system includes a server operatively connected to the endpoint device through a network. The server includes a steganographic module configured to receive configuration instructions, to generate a secret message corresponding to the configuration instructions, and to steganographically embed the secret message in a carrier file, including a media file selected from the group consisting of a text file, an image file, an audio file, and a video file. The carrier file is transmitted to the endpoint device which extracts the secret message from the carrier file, and which executes the configuration instructions in the secret message to reconfigure the endpoint device to commission or decommission the endpoint device or a component thereof. The method implements the system.

14 Claims, 3 Drawing Sheets

(56) References Cited

U.S. PATENT DOCUMENTS

| | | | |
|---|---|---|---|
| 2009/0003701 A1* | 1/2009 | Rekhi | H04N 1/32213 |
| | | | 382/176 |
| 2009/0113189 A1* | 4/2009 | Myles | G06F 21/606 |
| | | | 712/226 |
| 2015/0120888 A1 | 4/2015 | Arkko et al. | |
| 2016/0042193 A1* | 2/2016 | Hanner, Sr. | G06F 16/148 |
| | | | 726/26 |
| 2016/0087955 A1* | 3/2016 | Mohamad Abdul | |
| | | | H04L 47/125 |
| | | | 726/7 |
| 2018/0330115 A1* | 11/2018 | Felton | H04W 12/02 |
| 2019/0259374 A1* | 8/2019 | Kwon | H04W 12/06 |
| 2021/0000557 A1 | 1/2021 | Mustufa et al. | |
| 2025/0139257 A1* | 5/2025 | Alsharif | G06F 21/602 |

OTHER PUBLICATIONS

Sugandhi, et al., Efficient steganography using least significant bit and encryption technique, Date of Conference Jul. 8, 2016, Published Nov. 3, 2016, IEEE, pp. 1-6 (Year: 2016).*

* cited by examiner

200

COMPUTING DEVICE

202

PROCESSOR

MEMORY

204

206

COMMUNICATION
INTERFACE

USER
INTERFACE

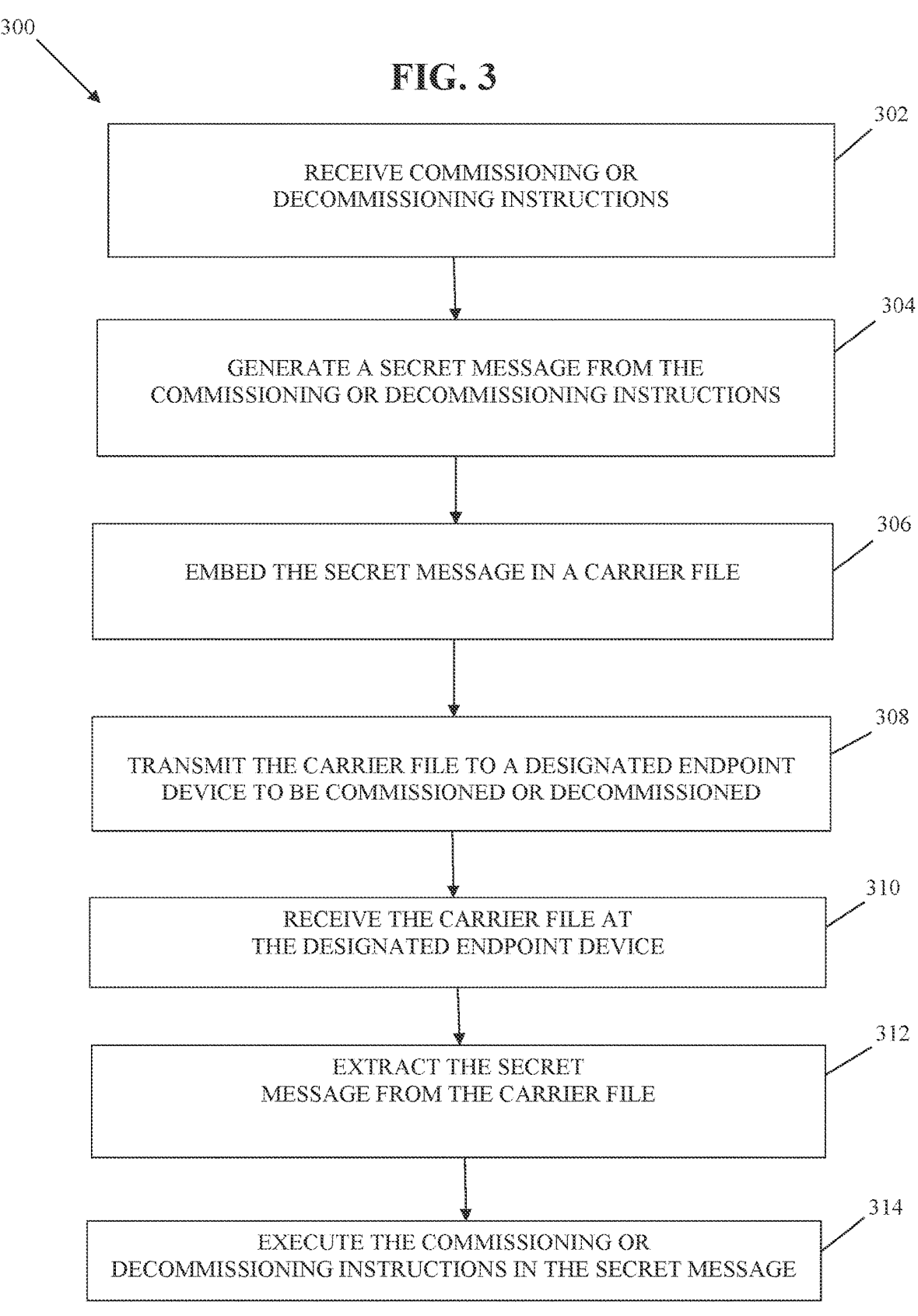

302
RECEIVE COMMISSIONING OR
DECOMMISSIONING INSTRUCTIONS

304
GENERATE A SECRET MESSAGE FROM THE
COMMISSIONING OR DECOMMISSIONING INSTRUCTIONS

306
EMBED THE SECRET MESSAGE IN A CARRIER FILE

308
TRANSMIT THE CARRIER FILE TO A DESIGNATED ENDPOINT
DEVICE TO BE COMMISSIONED OR DECOMMISSIONED

310
RECEIVE THE CARRIER FILE AT
THE DESIGNATED ENDPOINT DEVICE

312
EXTRACT THE SECRET
MESSAGE FROM THE CARRIER FILE

314
EXECUTE THE COMMISSIONING OR
DECOMMISSIONING INSTRUCTIONS IN THE SECRET MESSAGE

SYSTEM AND METHOD CONFIGURED TO COMMISSION AND DECOMMISSION ENDPOINT DEVICES USING STEGANOGRAPHY

FIELD OF THE DISCLOSURE

The present disclosure relates generally to commissioning and decommissioning computer-based apparatus, and, more particularly, to a system and method configured to commission and decommission endpoint devices using steganography.

BACKGROUND OF THE DISCLOSURE

In organizations, many computer-based endpoint devices are connected to and through a network. Each endpoint device or processes, applications, agents, modules, and sub-systems of such an endpoint device is configured by instructions and settings from a system administrator, so as to commission or decommission the endpoint device or processes, applications, agents, modules, and sub-systems thereof.

The process of commissioning and decommissioning such endpoint devices can be time-consuming and complex. If such commissioning and decommissioning are not handled in a secure manner, sensitive information can potentially leak or cause an impact to the security of the organization. In addition, such commissioning and decommissioning are often performed manually, and so can be time-consuming. Accordingly, another major factor that could jeopardize the organization is human error, which is a common cause of problems in any process for the commissioning and decommissioning of such endpoint devices.

The instructions sent from the system administrator can be sent to a client-side computer-based agent of the endpoint device. The client-side computer-based agent then responds to such instructions to perform the necessary procedures and sub-routines to commission or decommission the endpoint device or processes, applications, agents, modules, and sub-systems of the endpoint device. However, such transmission of instructions can be intercepted by third-parties, allowing the third-party to view or tamper with the commissioning and decommissioning of endpoint devices. Accordingly, the security of the commissioning and decommissioning can be compromised.

SUMMARY OF THE DISCLOSURE

One approach for securely commissioning and decommissioning endpoint devices is to add a layer of security to the commissioning and decommissioning process, such as transmitting such configuration instructions using secure communication techniques. According to an embodiment consistent with the present disclosure, a system and method are configured to commission and decommission an endpoint device using steganography by transmitting such configuration instructions steganographically embedded in a carrier file. The configuration instructions reconfigure the endpoint device to commission or decommission the endpoint device or a component thereof.

In an embodiment, a steganographic system comprises a hardware-based processor, a memory, a communication interface, and a set of modules. The memory is configured to store operating instructions and is configured to provide the operating instructions to the hardware-based processor. The communication interface is configured to establish a communication channel to an endpoint device. The set of modules is configured to implement the operating instructions provided to the hardware-based processor. The set of modules includes a steganographic module configured to receive configuration instructions, to generate a secret message corresponding to the configuration instructions, and to steganographically embed the secret message in a carrier file. The communication interface transmits the carrier file with the embedded instructions via the communication channel to the endpoint device. The endpoint device is configured to extract the secret message from the carrier file, and to execute the configuration instructions in the secret message, thereby reconfiguring the endpoint device based on the configuration instructions.

The carrier file can be a media file. The media file can be selected from the group consisting of: a text file, an image file, an audio file, and a video file. The steganographic module can steganographically embed the secret message in an image file as the media by altering at least one pixel of the image file. The steganographic module can steganographically embed the secret message in the image file using Least Significant Bit (LSB) insertion to encode the secret message by altering an LSB of the at least one pixel of the image file. Alternatively, the steganographic module can steganographically embed the secret message in an audio file as the media file using audio steganography to encode the secret message by altering at least one LSB of the audio file. The configuration instructions can reconfigure the endpoint device to commission a component of the endpoint device. Alternatively, the configuration instructions can reconfigure the endpoint device to decommission a component of the endpoint device.

In another embodiment, a system comprises a network, an endpoint device, and a steganographic sub-system. The endpoint device is operatively connected to the network, and includes a first hardware-based processor, a first memory, and a first set of modules. The first memory is configured to store first operating instructions and configured to provide the first operating instructions to the first hardware-based processor. The first set of modules is configured to implement the first operating instructions provided to the first hardware-based processor. The first set of modules includes a first steganographic module. The steganographic sub-system is operatively connected to the endpoint device through the network. The steganographic sub-system includes a second hardware-based processor, a second memory, a communication interface, and a second set of modules. The second memory is configured to store second operating instructions and is configured to provide the second operating instructions to the second hardware-based processor. The communication interface is configured to establish a communication channel through the network to the endpoint device. The second set of modules is configured to implement the second operating instructions provided to the second hardware-based processor. The second set of modules includes a second steganographic module configured to receive configuration instructions, to generate a secret message corresponding to the configuration instructions, and to steganographically embed the secret message in a carrier file. The communication interface transmits the carrier file with the embedded instructions via the communication channel to the endpoint device. The first steganographic module of the endpoint device is configured to extract the secret message from the carrier file. The first hardware-based processor executes the configuration instructions in the secret message, thereby reconfiguring the endpoint device based on the configuration instructions.

The carrier file can be a media file. The media file can be selected from the group consisting of: a text file, an image file, an audio file, and a video file. The second steganographic module can steganographically embed the secret message in an image file as the media by altering at least one pixel of the image file. The second steganographic module steganographically can embed the secret message in the image file using Least Significant Bit (LSB) insertion to encode the secret message by altering an LSB of the at least one pixel of the image file. Alternatively, the second steganographic module can steganographically embed the secret message in an audio file as the media file using audio steganography to encode the secret message by altering at least one LSB of the audio file. The configuration instructions can reconfigure the endpoint device to commission a component of the endpoint device. Alternatively, the configuration instructions can reconfigure the endpoint device to decommission a component of the endpoint device.

In a further embodiment, a method comprises receiving configuration instructions at a steganographic module, generating a secret message corresponding to the configuration instructions, steganographically embedding the secret message in a carrier file, transmitting the carrier file with the embedded instructions to the endpoint device, receiving the carrier file at the endpoint device, extracting the secret message from the carrier file, and executing the configuration instructions in the secret message, thereby reconfiguring the endpoint device based on the configuration instructions.

The configuration instructions can reconfigure the endpoint device to commission a component of the endpoint device. Alternatively, the configuration instructions can reconfigure the endpoint device to decommission a component of the endpoint device. The carrier file can be a media file selected from the group consisting of: a text file, an image file, an audio file, and a video file.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is a flowchart of the method of operation of the system of FIG. 1.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 300 configured to commission and decommission endpoint devices using steganography. By using steganographic methods and techniques to conceal configuration instructions, used to commission or decommission an endpoint device, in a message to the endpoint device, the system 100 and method 300 can securely send such configuration instructions without being detected by unauthorized parties. The configuration instructions can include steps for disabling access of an endpoint device to the network 104, wiping storage in an endpoint device, and uninstalling any specific software and applications.

Figure 1:
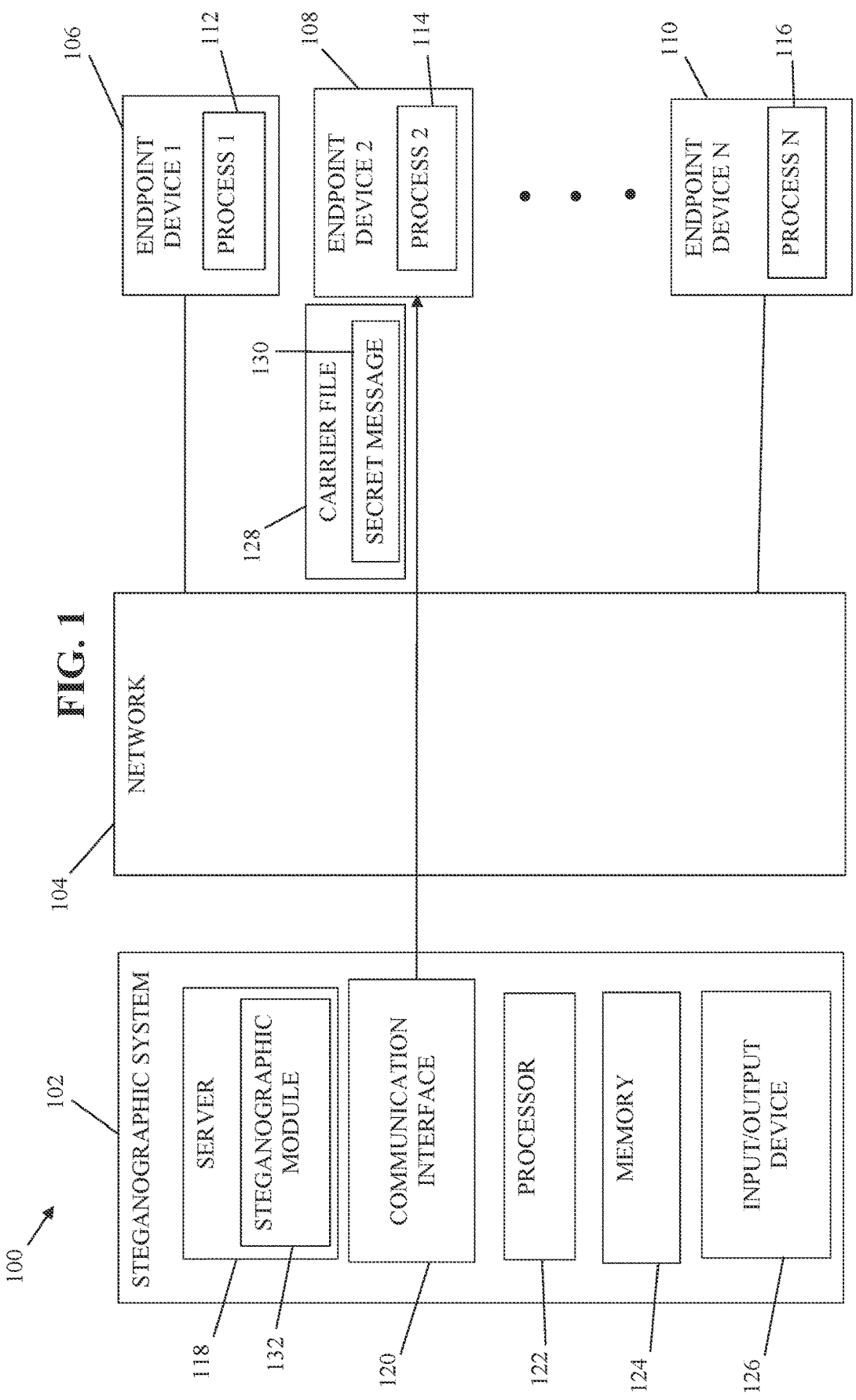
FIG. 1 is a schematic of a system, according to an embodiment.

As shown in FIG. 1, the system 100 includes a steganographic system 102, a network 104, and at least one endpoint device 106, 108, 110. The steganographic system 102 is operatively connected to the network 104. The steganographic system 102 can be a sub-system of the overall system 100. The network 104 is operatively connected to the at least one computer-based endpoint device 106, 108, 110. Each endpoint device 106, 108, 110 can be a client device of an organization. The network 104 can be the Internet connecting each endpoint device 106, 108, 110 to devices such as website servers outside of the organization, as well as to other computer devices of the organization, such as a server, an intranet, or other client devices. Alternatively, the network 104 can be an intranet of the organization connecting each endpoint device 106, 108, 110 to other computer devices of the organization, such as an intranet server or other client devices. Each endpoint device 106, 108, 110 includes a respective computer-based process 112, 114, 116. Each process 112, 114, 116 can include an application, an agent, a module, or a sub-system of the respective endpoint device 106, 108, 110. Through the network 104, the steganographic system 102 is operatively connected to each endpoint device 106, 108, 110 and the respective computer-based processes 112, 114, 116.

The steganographic system 102 includes a server 118, a communication interface 120, a hardware-based processor 122, a memory 124 configured to store operating instructions and configured to provide the operating instructions to the hardware-based processor 122, and an input/output device 126. The steganographic system 102 can include a set of modules configured to implement the operating instructions provided to the hardware-based processor 122. The server 118 can be a central server of the organization, with the at least one endpoint device 106, 108, 110 being a client device associated with the server 118. As described in greater detail below, the steganographic system 102 can generate and output, through the communication interface 120, a carrier file 128 including a secret message 130 having configuration instructions. The communication interface 120 is configured to establish a communication channel through the network 104 to at least one endpoint device 106, 108, 110. The carrier file 128 can be a data file in a predetermined format. Alternatively, the carrier file 128 can be a data signal representing the data of a data file generated by the steganographic system 102. The carrier file 128 is transmitted through the network 104 to at least one of the endpoint devices 106, 108, 110 to reconfigure the at least one endpoint device 106, 108, 110 using the configuration instructions from the secret message 130 to commission or decommission the at least one endpoint device 106, 108, 110 or a component thereof. For example, without loss of generality, the steganographic system 102 transmits the carrier file 128 to the endpoint device 108 to commission or decommission the endpoint device 108, or at least one application, agent, module, or sub-system of the endpoint device 108. As described in greater detail below, the carrier file 128 includes a secret message 130 generated by a steganographic module 132 of the server 118. The steganographic module 132 is configured to implement the operating instructions provided to the hardware-based processor 122 from the memory 124.

Each endpoint device 106, 108, 110 is operatively connected to the network 104. Each endpoint device 106, 108, 110 can include a hardware-based processor and a memory configured to store operating instructions and configured to provide the operating instructions to the hardware-based processor of the respective endpoint device 106, 108, 110. Each endpoint device 106, 108, 110 can include a set of modules configured to implement the operating instructions provided to the hardware-based processor of the respective endpoint device 106, 108, 110. The set of modules of the respective endpoint device 106, 108, 110 includes a respective steganographic module configured to extract the secret message 130 in the carrier file 128.

Figure 2:
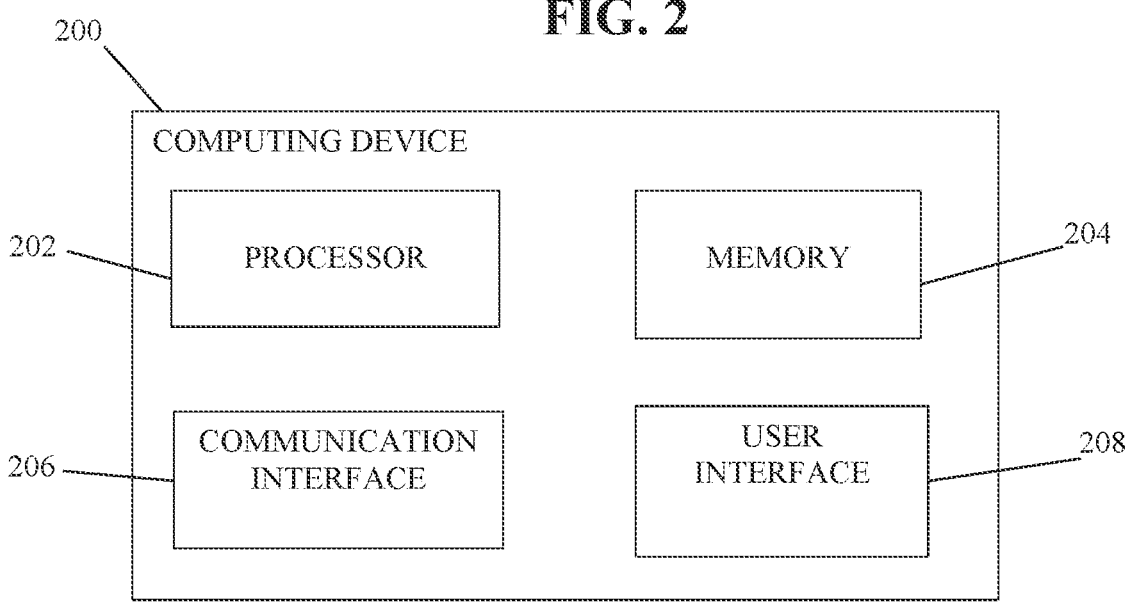
FIG. 2 is a schematic of a computing device used in the embodiment.

FIG. 2 illustrates a schematic of a computing device 200 including a processor 202 having code therein, a memory 204, and a communication interface 206. Optionally, the computing device 200 can include a user interface 208, such as an input device, an output device, or an input/output device. The processor 202, the memory 204, the communication interface 206, and the user interface 208 are operatively connected to each other via any known connections, such as a system bus, a network, etc. Any component, combination of components, and modules of the system 100 in FIG. 1 can be implemented by a respective computing device 200. For example, each of the steganographic system 102, the network 104, the endpoint devices 106, 108, 110, the server 118, the communication interface 120, the processor 122, the memory 124, the input/output device 126, and the steganographic module 132 shown in FIG. 1 can be implemented by a respective computing device 200 shown in FIG. 2 and described below.

It is to be understood that the computing device 200 can include different components. Alternatively, the computing device 200 can include additional components. In another alternative embodiment, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can implement the processor 122 in FIG. 1. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative embodiment, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative embodiment, the processor 202 can include a plurality of nodes or artificial neurons configured as an artificial neural network. The processor 202 can be configured to implement any known artificial neural network, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage. The memory 204 can implement the memory 124 in FIG. 1.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative embodiment, the instructions are executable by the processor 202 to cause the computing device 200 to execute an artificial neural network. The processor 202 can be implemented using hardware or software, such as the code. The processor 202 can implement a system, a sub-system, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement the communication interface 120 in FIG. 1. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can implement the input/output device 126 in FIG. 1. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Referring to FIG. 3, the method 300 includes receiving configuration instructions, such as commissioning or decommissioning instructions, in step 302. The configuration instructions are configured to commission or decommission the endpoint device 108. The configuration instructions can be generated in step 302 from inputs received through the input/output device 126 from a system administrator. For example, using the input/output device 126, the system administrator can input commands to the server 118 designating the endpoint device 106, 108, 110 to be commissioned or decommissioned. Alternatively, instead of commissioning or decommissioning an entire endpoint device 106, 108, 110, the commands can designate a particular application, agent, module, or a sub-system of a designated endpoint device, with the commands commissioning or decommissioning the particular application, agent, module, or a sub-system. In addition, using the input/output device 126, the system administrator can input commands to the server 118 which specify whether the endpoint device or components thereof are to be commissioned, or alternatively are to be decommissioned. The server 118 generates the configuration instructions from the commands input by the system administrator through the input/output device 126.

In an embodiment, the system administrator inputs such commands through the input/output device 126 in any known format, such as BASH, POWERSHELL, or JAVASCRIPT commands. The format of such commands depends on the configuration and specifications of the target endpoint device and a supported scripting language. Alternatively, the commands can be input through the input/output device 126 using any known programming language or script. The commands can instruct the endpoint device to configure the network 104 and components thereof such as routers, switches and firewall, the commands can also implement a security configuration including enabling a secret or password-based encryption. The commands can also implement networking monitoring for status and performance. The exact command can vary depending on the network 104, the operating system of the system 100, and a device command list.

Alternatively, the input/output device 126 can include a user interface, such as a graphic user interface (GUI). The GUI can display a pull-down menu to the system administrator, allowing the system administrator to select the endpoint device or components thereof to be commissioned or decommissioned. In addition, the GUI can display another pull-down menu to select whether the endpoint device or components thereof are to be commissioned, or alternatively are to be decommissioned. The GUI can further display a control icon or button, for example, labelled "START" to initiate the generation and transmission of the secret message 130 in steps 304-308. Alternatively, the configuration instructions can be generated automatically by the server 118 using configuration data stored in the memory 124. The configuration data can be used by the server 118 to generate the configuration instructions to automatically commission or decommission the particular endpoint device or components thereof.

The method 300 generates the secret message 130 from the received configuration instructions in step 304 using the server 118. The secret message 130 including commands or scripts can be in a text file format. Alternatively, the secret message 130 can be in any known file format. The method 300 then embeds the secret message 130 into the carrier file 128 in step 306 using the steganographic module 132 implementing known steganographic methods and techniques. The carrier file 128 can be a media file. The media file can be stored in a media library stored in the memory 124 to be used to convey the secret message 130. In one embodiment, the carrier file 128 can be text file in a predetermined text file format. For example, the carrier file 128 can be in a Rich Text Format (RTF). In another embodiment, the carrier file 128 can be in a HyperText Markup Language (HTML) format. Alternatively, the carrier file 128 can be in any known text format.

In another embodiment, the carrier file 128 can be a picture or image file. For example, the carrier file 128 can be in the Joint Photographic Experts Group (JPEG) format. Alternatively, the carrier file 128 can be in any known image format. Using the steganographic module 132, the secret message 130 is embedded in an image file as the carrier file 128 in step 306 using Least Significant Bit (LSB) insertion, which involves altering the least significant bit of each pixel in an image file as the carrier file 128 to embed the secret message 130. In a further embodiment, the steganographic module 132 embeds the secret message 130 into an image file using an "Invisible Ink" technique. Using known "Invisible Ink" software, applications, or methods, the steganographic module 132 hides the secret message 130 within an image file as the carrier file 128 in a way that is not detectable to the naked eye.

In another embodiment, the carrier file 128 can be an audio file. The secret message 130 is embedded into the audio file by the steganographic module 132 using audio steganography, which involves embedding the secret message 130 in the least significant bits of an audio file as the carrier file 128. In a further embodiment, the carrier file 128 can be a video file. For example, the carrier file 128 can be in the Moving Picture Experts Group (MPEG) format. Alternatively, the carrier file 128 can be in any known video format.

Using the commands input by the system administrator or by configuration data as described above, the carrier file 128 is transmitted to a particular endpoint device 106, 108, 110 to be commissioned or decommissioned. Alternatively, the carrier file 128 can be tagged or associated with a routing message indicating the endpoint device 106, 108, 110 or a component thereof to be commissioned or decommissioned. For example, the server 118 can respond to the input commands or configuration data to concatenate the carrier file 128 with the routing message. In response to the routing message, the server 118 can direct the communication interface 120 to send the carrier file 128 to the designated endpoint device 106, 108, 110 through the network 104. For example, the routing message can designate the carrier file 128 with the embedded secret message 130 to be sent to the endpoint device 108.

The method 300 then transmits the carrier file 128 to the endpoint device 108 as the designated endpoint device in step 308. The network 104 transmits the carrier file 128 to the designated endpoint device. For example, the transmission of the carrier file 128 can be performed using a secure communication protocol, such as an agent-based service provisioned to use the Hypertext Transfer Protocol Secure (HTTPS) protocol or other known secure communication protocols. The designated endpoint device receives the carrier file 128 in step 310, and a respective process of the designated endpoint device extracts the secret message 130 from the carrier file 128 in step 312. The process can be a client-side agent. Alternatively, the process can be an application. In another embodiment, the process can be a module. The process can include a client-side steganographic module configured to extract the secret message 130 from the carrier file 128. In the example above, the process 114 of the endpoint device 108 extracts the secret message 130 from the carrier file 128. As described above, the secret message 130 includes the configuration instructions. The client-side steganographic module of the process 114 can use known steganographic detection techniques to extract the secret message 130. For example, a steganographic detection technique reverses the steganographic technique used to embed the secret message 130, and so the secret message 130 is revealed for use by the process 114 of the endpoint device 108.

Alternatively, the server 118 can tag or associate the carrier file 128 with a steganographic identification message which indicates the type of steganographic technique used to embed the secret message 130 into the carrier file 128. For example, the steganographic identification message can be concatenated with the carrier file 128 by the server 118. Using the steganographic identification message, the client-side steganographic module of the process 114 can use known the corresponding steganographic technique to extract the secret message 130.

The method 300 executes the extracted configuration instructions from the secret message 130 in step 314 to commission or decommission the endpoint device 108 or a component thereof using the process 114. Using the system 100 and method 300, the configuration instructions used to commission or decommission an endpoint device or a component thereof can be transmitted securely in a message to the endpoint device without being detected by unauthorized parties. The endpoint devices 106, 108, 110 of an organization or components thereof can be properly commissioned and decommissioned in a secure and controlled manner. For example, a system administrator can control the commissioning and decommissioning of components in an organization using a central server 118 instead of manually controlling each endpoint device 106, 108, 110 to be commissioned or decommissioned.

Accordingly, such proper commissioning and decommissioning of components of the organization can help to enhance the overall security of the organization, increase efficiency in managing components of the organization, improve the accuracy of the commissioning and decommissioning, and reduces costs by managing such commissioning and decommissioning.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A steganographic system, comprising:
a hardware-based processor;
a memory configured to store operating instructions and configured to provide the operating instructions to the hardware-based processor;
a communication interface configured to establish a communication channel to an endpoint device; and
a server including a set of modules implementing the operating instructions provided to the hardware-based processor, the set of modules including:
a steganographic module receiving configuration instructions to reconfigure the endpoint device to commission or to decommission at least a first component of the endpoint device, to generate a secret message corresponding to the configuration instructions, to steganographically embed the secret message in a carrier file using a predetermined steganographic technique, to generate a steganographic identification message which indicates the predetermined steganographic technique, and to concatenate the steganographic identification message and the carrier file,
wherein the communication interface transmits the concatenation of the steganographic identification message and the carrier file with the embedded instructions via the communication channel to the endpoint device, and wherein the endpoint device is configured to extract the steganographic identification message from the concatenation, to extract the secret message from the carrier file using the predetermined steganographic technique in the extracted steganographic identification message, to extract the configuration instructions in the secret message, and to execute the configuration instructions extracted from the secret message, thereby reconfiguring the endpoint device based on the configuration instructions to commission or to decommission the at least a first component of the endpoint device.

2. The steganographic system of claim 1, wherein the carrier file is a media file.

3. The steganographic system of claim 2, wherein the media file is selected from the group consisting of: a text file, an image file, an audio file, and a video file.

4. The steganographic system of claim 3, wherein the steganographic module steganographically embeds the secret message in an image file as the media by altering at least one pixel of the image file.

5. The steganographic system of claim 4, wherein the steganographic module steganographically embeds the secret message in the image file using Least Significant Bit (LSB) insertion to encode the secret message by altering an LSB of the at least one pixel of the image file.

6. The steganographic system of claim 3, wherein the steganographic module steganographically embeds the secret message in an audio file as the media file using audio steganography to encode the secret message by altering at least one Least Significant Bit (LSB) of the audio file.

7. A system, comprising:
a network;
an endpoint device operatively connected to the network, and including:
a first hardware-based processor;
a first memory configured to store first operating instructions and configured to provide the first operating instructions to the first hardware-based processor; and
a computing device including a first set of modules implementing the first operating instructions provided to the first hardware-based processor, the first set of modules including:
a first steganographic module; and
a steganographic sub-system operatively connected to the endpoint device through the network, and including:
a second hardware-based processor;
a second memory configured to store second operating instructions and configured to provide the second operating instructions to the second hardware-based processor;
a communication interface configured to establish a communication channel through the network to the endpoint device; and
a server including a second set of modules implementing the second operating instructions provided to the second hardware-based processor, the second set of modules including:
a second steganographic module receiving configuration instructions to reconfigure the endpoint device to commission or to decommission at least a first component of the endpoint device, to generate a secret message corresponding to the configuration instructions, to steganographically embed the secret message in a carrier file using a predetermined steganographic technique, to generate a steganographic identification message which indicates the predetermined steganographic technique, and to concatenate the steganographic identification message and the carrier file,
wherein the communication interface transmits the concatenation of the steganographic identification message and the carrier file with the embedded instructions via the communication channel to the endpoint device,
wherein the first steganographic module of the endpoint device is configured to extract the steganographic identification message from the concatenation, to extract the secret message from the carrier file using the predetermined steganographic technique in the extracted steganographic identification message, to extract the configuration instructions in the secret message, and
wherein the first hardware-based processor executes the configuration instructions extracted from the secret message, thereby reconfiguring the endpoint device based on the configuration instructions to commission or to decommission the at least a first component of the endpoint device.

8. The system of claim 7, wherein the carrier file is a media file.

9. The system of claim 8, wherein the media file is selected from the group consisting of: a text file, an image file, an audio file, and a video file.

10. The system of claim 9, wherein the second steganographic module steganographically embeds the secret message in an image file as the media by altering at least one pixel of the image file.

11. The system of claim 10, wherein the second steganographic module steganographically embeds the secret message in the image file using Least Significant Bit (LSB) insertion to encode the secret message by altering an LSB of the at least one pixel of the image file.

12. The system of claim 9, wherein the second steganographic module steganographically embeds the secret message in an audio file as the media file using audio steganography to encode the secret message by altering at least one Least Significant Bit (LSB) of the audio file.

13. A method, comprising:
receiving configuration instructions at a steganographic module to reconfigure an endpoint device to commission or to decommission at least a first component of the endpoint device;
generating a secret message corresponding to the configuration instructions;
steganographically embedding the secret message in a carrier file using a predetermined steganographic technique;
generating a steganographic identification message which indicates the predetermined steganographic technique;
concatenating the steganographic identification message and the carrier file;
transmitting the concatenation of the steganographic identification message and the carrier file with the embedded instructions to the endpoint device;
receiving the concatenation of the steganographic identification message and the carrier file at the endpoint device;
extracting the steganographic identification message from the concatenation;
extracting the secret message from the carrier file using the predetermined steganographic technique in the extracted steganographic identification message;

extracting the configuration instructions in the secret message; and executing the configuration instructions extracted from the secret message, thereby reconfiguring the endpoint device based on the configuration instructions to commission or to decommission the at least a first component of the endpoint device.

14. The method of claim 13, wherein the carrier file is a media file selected from the group consisting of: a text file, an image file, an audio file, and a video file.

* * * * *